United States Patent [19]

Nishikawa et al.

[11] Patent Number: 5,539,426
[45] Date of Patent: Jul. 23, 1996

[54] IMAGE DISPLAY SYSTEM

[75] Inventors: Mineki Nishikawa; Daizo Oikawa, both of Nishinasunomachi, Japan

[73] Assignee: Kabushiki Kaisha Toshiba, Kawasaki, Japan

[21] Appl. No.: 231,976

[22] Filed: Apr. 21, 1994

Related U.S. Application Data

[63] Continuation of Ser. No. 884,850, May 13, 1992, abandoned, which is a continuation of Ser. No. 501,945, Mar. 30, 1990, abandoned.

[30] Foreign Application Priority Data

Mar. 31, 1989 [JP] Japan ..................... 1-83533

[51] Int. Cl.⁶ ..................................... G09G 5/00
[52] U.S. Cl. ................ 345/115; 345/119; 345/127
[58] Field of Search ..................... 345/115, 119, 345/120, 127, 131, 147, 148, 149; 348/239, 578

[56] References Cited

U.S. PATENT DOCUMENTS

| | | | |
|---|---|---|---|
| 4,011,401 | 3/1977 | Presti | 348/578 |
| 4,030,119 | 6/1977 | Ellis | 358/111 |
| 4,079,417 | 3/1978 | Scudder, III | 358/111 |
| 4,642,621 | 2/1987 | Nemoto et al. | 364/413.22 |
| 4,688,175 | 8/1987 | Kaneko et al. | 358/111 |
| 4,858,129 | 8/1989 | Mori | 358/111 |
| 4,888,794 | 12/1989 | Haaker et al. | 358/111 |
| 4,941,195 | 7/1990 | Tanaka et al. | 358/111 |
| 5,027,110 | 6/1991 | Chang et al. | 340/717 |
| 5,179,651 | 1/1993 | Taaffe et al. | 395/154 |

FOREIGN PATENT DOCUMENTS

| | | |
|---|---|---|
| 2535497 | 5/1984 | France . |
| 0045543 | 3/1984 | Japan ..................... 340/721 |
| 0114631 | 7/1984 | Japan ..................... 340/721 |
| WO8800026 | 1/1988 | Japan . |

OTHER PUBLICATIONS

"A New Overhead Projection System Using a 400 × 600 Pixel Active-Matrix LCD," Review Of Electrical Communication Laboratories, vol. 36, No. 4, Jul. 1988, Tokyo, Japan, pp. 441–417.

*Primary Examiner*—Richard Hjerpe
*Assistant Examiner*—M. Fatahiyar
*Attorney, Agent, or Firm*—Cushman, Darby & Cushman

[57] ABSTRACT

An image display system, for displaying image data having image information and at least one graduation characteristic range. The image display system has a reduction display section, a designation section and a designation display section. The reduction display section displays a plurality of reduced images, having the same image information, aligned in at least one predetermined direction based on where a particular graduation characteristic of each reduced image falls within the graduation characteristic range. The designation section specifies an image out of the plurality of reduced images displayed by the reduction display section. The designation display section displays an unreduced image of the specified image.

18 Claims, 4 Drawing Sheets

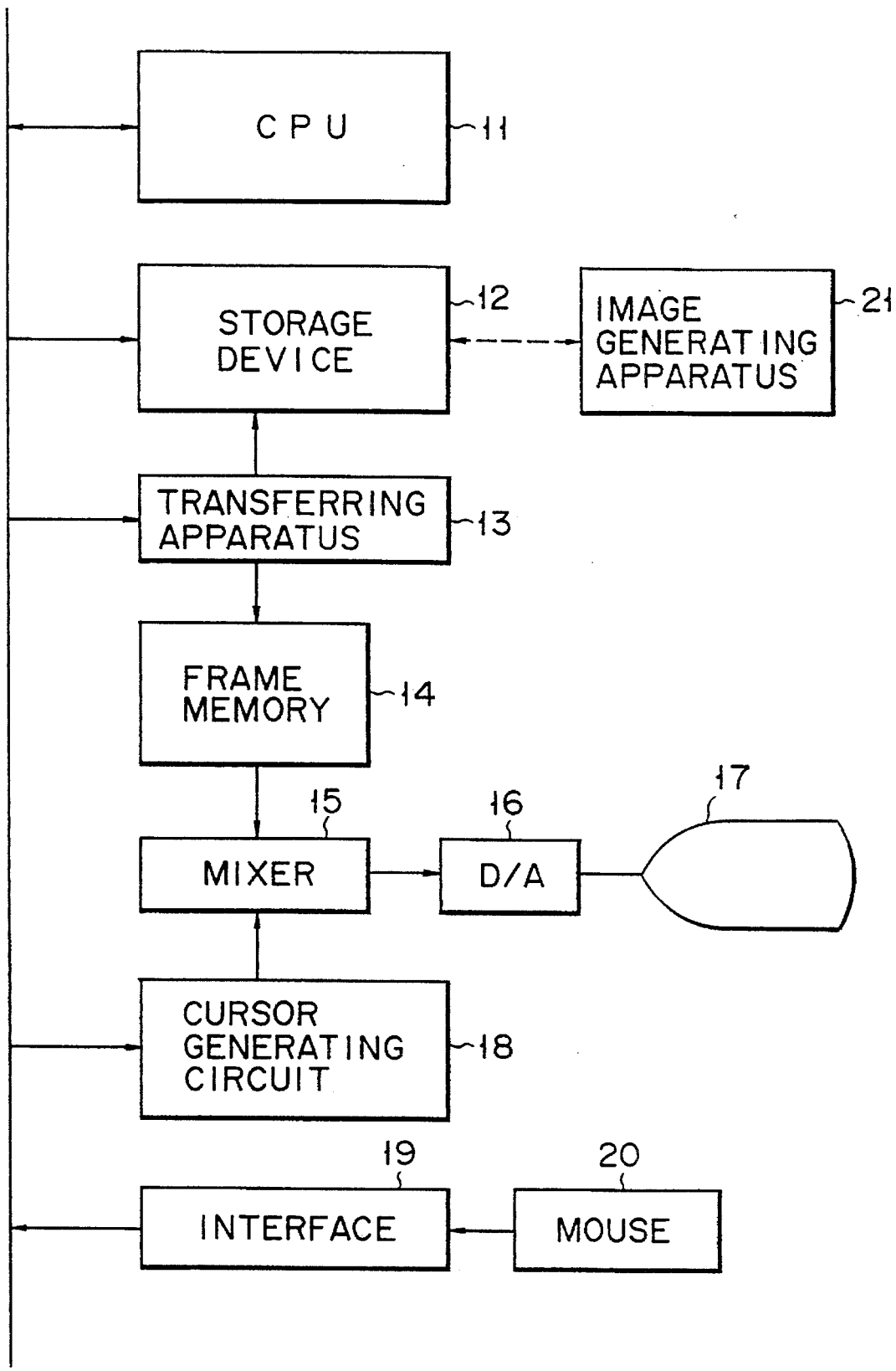
F I G. 1

IMAGE DISPLAY SYSTEM

This is continuation of application No. 07/884,850filed on May 13, 1992, which was abandoned upon the filing hereof which is a FWC of 07/501,945, filed on Mar. 30, 1990, now abandoned.

BACKGROUND OF THE INVENTION

1. Field of the Invention

The present invention relates to an image display system which converts image data into display data using display parameters set by an operator and displays image information. More particularly, this invention relates to an image display system which is for use in a system involving plural types of display parameters contributing to emphasis of image information components and can effectively set display parameters.

2. Description of the Related Art

In displaying a CT (Computerized Tomography) image on a display of a CT apparatus, since image information of a CT image has a significant number of gradations compared with the display performance of the display, the desired gradation characteristic is given to a desired part of the entire gradation range for image display. Such processing is performed on not only a CT image but also other various types of image information. With regard to medical diagnosis images, for instance, similar processing is performed on image information, such as an MR (Magnetic Resonance) image, digital radiographic image and nuclear medicine image. In such a case, normally, original image data is converted into display data affixed with display gradation normally varying on a linear base within a gradation level range of a desired window width (WW), i.e., a desired level width around a desired level or window level (WL) of the whole gradation level. The window level (WL) and window width (WW) are conversion parameters used in converting image data into display data. The conversion parameters are called display parameters. In many systems, the window width (WW) and window level (WL) are altered by an operator's operating a switch or a key on a keyboard or rotating a knob, and an image corresponding to the window width (WW) or window level (WL) at that time is sequentially displayed. The operator repeats the above operation to change the window width (WW) and window level (WL) as desired, thereby acquiring the desired, corresponding display images.

The relation between the values of the window width (WW) and window level (WL) and a desired or required display image is not always clear or known to the operator. The operator, therefore, should properly set and vary the window width (WW) and window level (WL) to understand how the display image changes with a variation in these values to thereby cause the resultant display image to gradually approach the desired one. This inevitably requires great amounts of time and labor for the adjustment. Depending on the initial values of the window width (WW) and window level (WL) selected in the adjustment, however, part of that information included in the image data which is beneficial or interesting to the operator may not appear in the display image, so that the operator is likely to overlook it.

SUMMARY OF THE INVENTION

As described above, the conventional systems do not offer a clear correlation between the values of display parameters, such as the window width (WW) and window level (WL), and the display status of an image of interest to an operator, so that the operator cannot easily grasp the correlation, thus often requiring much time and labor to acquire the desired image.

Accordingly, it is an object of this invention to provide an image display system which can offer a clear correlation between display parameters and an actual image, and assure setting of parameters corresponding to the desired display status with a simple operation to thereby facilitate acquiring of the proper display image.

According to the present invention, there is provided an image display system for converting image data into display data in accordance with display parameters to display image information, which system comprises:

- a reduction display section for displaying a plurality of reduced images aligned at least in one predetermined direction;
- a parameter control section for giving display parameters gradually differing along the predetermined direction of the plurality of reduced images displayed by the reduction display section;
- a designation section for specifying positions at least along the predetermined direction on the plurality of reduced images displayed by the reduction display section; and
- a display section for displaying an unreduced image specified by parameters corresponding to the positions specified by the designation section, independently of the plurality of reduced images.

According to the present image display system, an operator can simultaneously view various values of image display parameters, such as a window width (WW) and a window level (WL), in an image reduced mode, and can thus see at a glance how the display image is changing, and will change, with a change in display parameters. This reduces the time and labor required for the operator to acquire images in a preferable or desirable display status as well as reducing the possibility of an operator overlooking useful information included in the image data.

In other words, the present image display system can permit the operator to understand at a glance a variation in display parameters, such as a WW value and a WL value, and the tendency as to how a display image will vary with a change in the parameters; and can thus ensuring easy acquiring of a display image using the desired parameters. This can relieve the operator of his or her burden. Particularly, applying the present invention to an image display system for medical diagnostic use can shorten the time required for diagnosis, improve the diagnostic accuracy and increase the diagnosis throughput of doctors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram illustrating the arrangement of an image display system according to one embodiment of the present invention;

DETAILED DESCRIPTION OF THE PREFERRED EMBODIMENT

Figure 2:
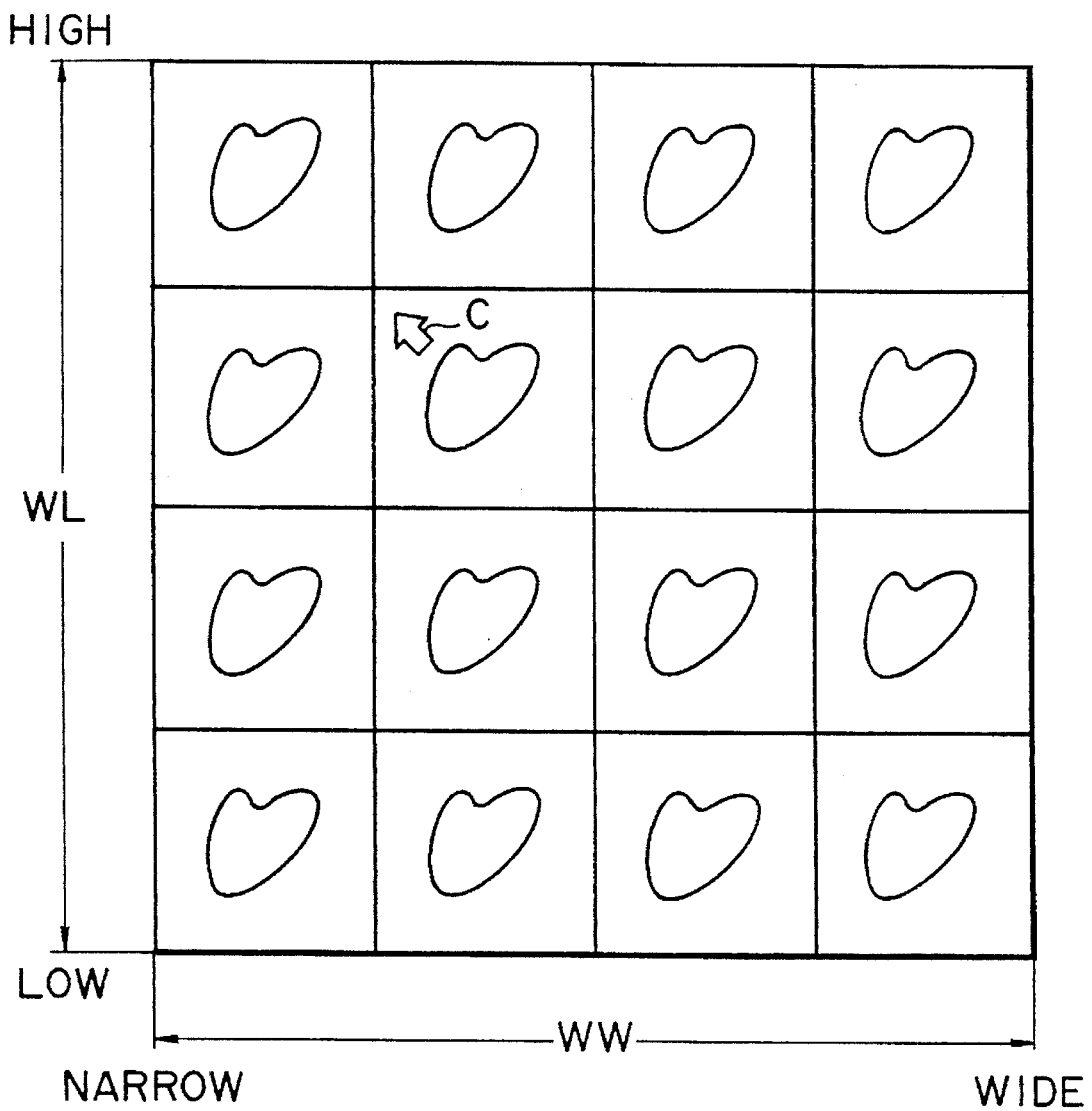
FIG. 2 exemplifies a display image according to this embodiment at the time parameters are set.

FIG. 1 illustrating the arrangement of an image display system according to a preferred embodiment of the present invention.

The system shown in FIG. 1 comprises a CPU (Central Processing Unit) 11, a storage device 12, a transferring apparatus 13, a frame memory 14, a mixer 15, a D/A (Digital-to-Analog) converter 16, a display apparatus 17, a cursor generating circuit 18, an interface 19 and a mouse 20. The CPU 11, storage device 12, transferring apparatus 13, cursor generating circuit 18 and interface 19 are coupled to a common bus. The storage device 12 stores original image data from an image generating apparatus 21, such as a CT apparatus or an magnetic resonance imaging (MRI) system. The image generating apparatus 21 is an apparatus to generate original image data, but may be an image database which holds images produced in advance by a CT apparatus, an MRI apparatus or another type of image pickup apparatus. The transferring apparatus 13 transfers image data to be displayed to the frame memory 14 used for a displaying purpose from the storage device 12 in, for example, a DMA (Direct Memory Access) mode. The cursor generating circuit 18 generates data for displaying a cursor. The mixer 15 mixes display image information stored in the frame memory 14 with the cursor display data generated from the circuit 18. The mixed data from the mixer 15 is converted into an analog signal in the D/A converter 16, then supplied to the display apparatus 17 to be displayed. Operating the mouse 20 coupled via a bus to the interface 19 changes the position of the cursor displayed to the cursor display data from the circuit 18.

With regard to displaying a CT image, for instance, typical image display parameters are a window width (WW) and a window level (WL). According to this embodiment, in setting such display parameters, a screen is divided into 16 segments, as exemplified in FIG. 2, under the control of the CPU 11, and sixteen images reduced in size are displayed on the display apparatus 17, with the horizontal scale (X) of the screen being an WW axis while the vertical scale (Y) being a WL axis. The sixteen reduced images have been obtained by the transferring apparatus 13 and given with display gradations of window width values (hereinafter referred to as WW values) and window level values (hereinafter referred to as WL values) corresponding to the display positions of the images, when transferred to the frame memory 14 from the storage device 12. Accordingly, the sixteen reduced images have their respective WW values and WL values corresponding to their two-dimensional positions. An operator operates a pointing device, such as the mouse 20, to move the cursor C on the screen and specifies the WW and WL values associated with the position of the cursor C.

In this case, the WW and WL values may each be set in specific association with (e.g., one specific value for each reduced image) individual reduced images displayed on that screen segment where the cursor is on, so that only discrete WW and WL values can be specified for the respective segmented images. Alternately, arbitrary coordinates of each segmented image may be permitted to be taken as the WW and WL values, so that the WW and WL values can be specified or selected from continuous values.

Figure 3:
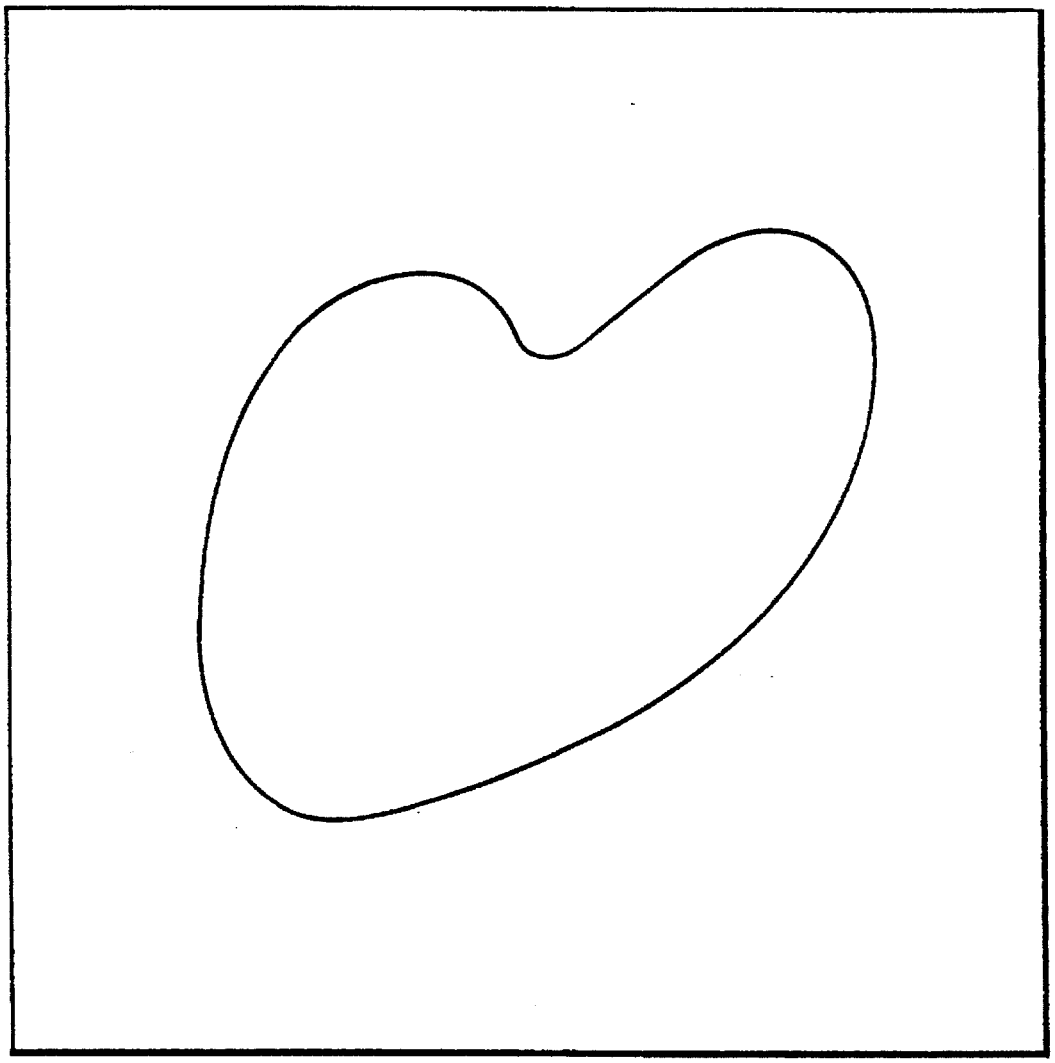
FIG. 3 exemplifies a display image according to this embodiment after the time parameters are set.

A display image having the WW and WL values specified in the above manner is displayed, enlarged as shown in, for example, FIG. 3, on a displace screen of the display apparatus 17 different from the one for the segmented images.

Figure 4:
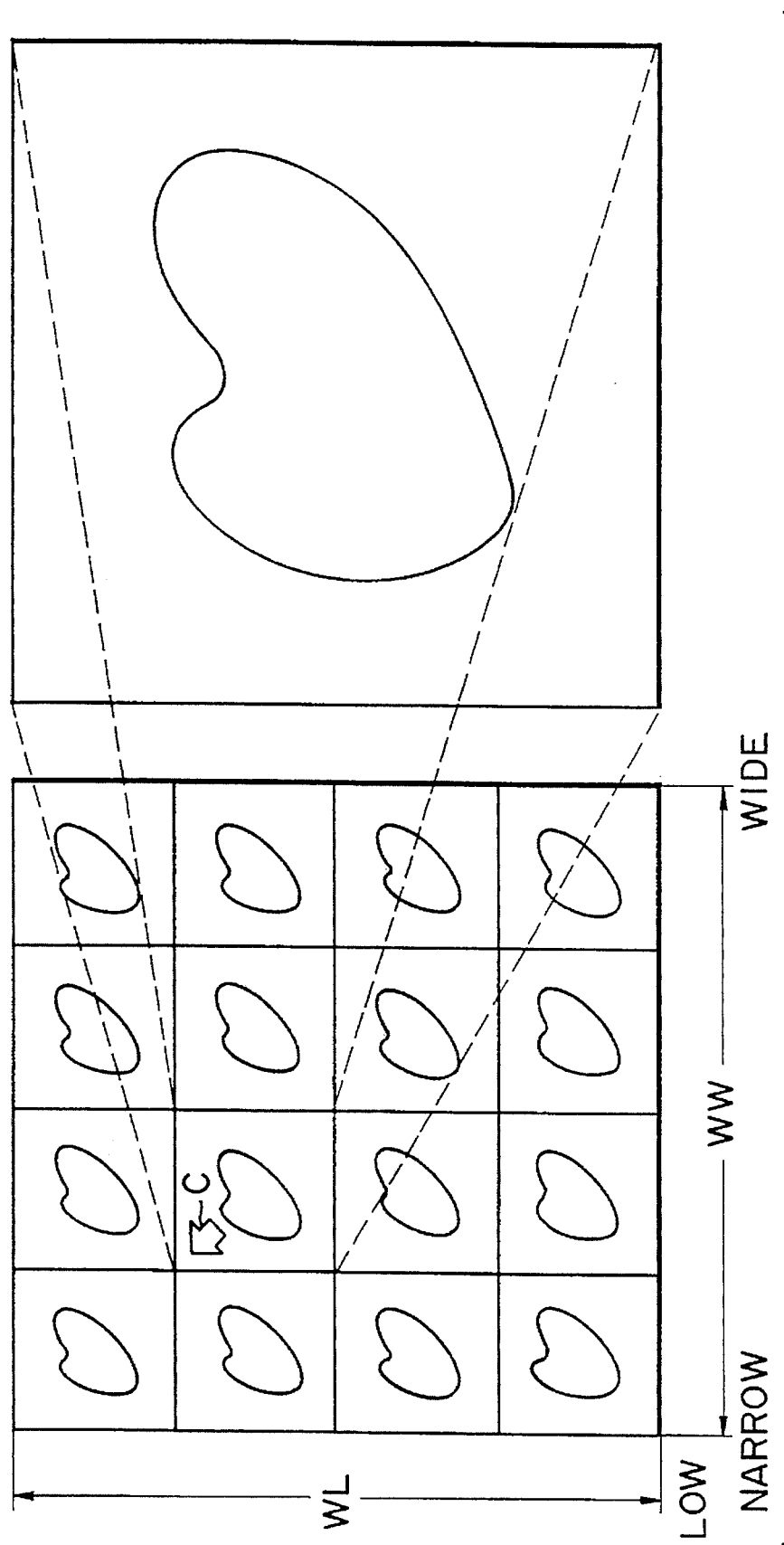
FIG. 4 is a schematic diagram illustrating an image display section of this embodiment.

The display screen for the segmented images on the display apparatus 17 and the display screen for the display image having the WW and WL values specified by the cursor C are typically located side by side, as shown in FIG. 4. Alternately, these screens may of course be arranged vertically. It is desirable that the display screen for the segmented images and that for the display image having the specified WW and WL values be displayed on separate display devices. However, a part of the display screen of one display device may be used as one of the two display screens while another part serves as the other display screen. In this case, these two display screens may be displayed partially overlapping one on the other using a so-called multi-window display function. More specifically, an image specified by selected parameters may be displayed entirely over the same display screen for reduced images or another display screen, or may be displayed on part of either screen, in a size larger than each reduced image.

Alternately, after specifying the WW and WL values, a display image having the specified values may be displayed, enlarged, on the same display screen for the segmented images of the display apparatus 17.

The present invention is not limited to the above-described embodiment illustrated in the accompanying drawings, but may be worked out in various manners within the scope and spirit of the invention.

For instance, in the above-described embodiment, a plurality of reduced images are displayed two-dimensionally on the respective sixteen segmented screens which are obtained by dividing the display screen of the display apparatus into four segments each along the X and Y axes. If there is only one display parameter to be set, however, a plurality of reduced images may be displayed in a line vertically, horizontally or obliquely and the parameter may be specified along the aligning direction. If there are many display parameters, they may be specified by repeating a linear display, or two-dimensional display of, reduced images. Of course, the display screen may be divided into a greater number of segments to ensure the display of an even greater number of reduced images.

In addition, the parameters may be selected by moving the cursor on the screen using a trackball or arrow keys, instead of the mentioned mouse, or may be selected by specifying coordinates on the screen using a light pen or the like. Furthermore, instead of using such a pointing device, a numeral or code may be affixed to each reduced image so that display parameters can be specified by entering the numeral or code using keys.

The display parameters to be set are of course are not limited to the window width (WW) and window level (WL), but may be filtering values or the like.

The present invention can apply not only to a CT apparatus but also any system which displays an image having display parameters like those mentioned above that can contribute to emphasis of a display image. For instance, this invention can effectively apply to medical diagnosis imaging systems including an MRI system, digital radiography system, and a nuclear medicine imaging system, such as a positron camera, emission CT, single photon emission CT (SPECT) or positron CT.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image display apparatus comprising:

means for converting an original image into a plurality of processed images by using an image processing procedure, the image processing procedure having parameters, each of which can assume different values, the image data having a graduation characteristic whose range is given by window width and whose medium graduation is given by window level;

means for displaying said plurality of processed images in a two-dimensional array based on an ascending or descending order of the values of parameters used for obtaining the processed images, one direction of the array corresponding to the window width and a second direction of the array corresponding to the window level, and a display portion of each of said plurality of images being determined by a combination of the window width and the window level;

designation means for specifying an image among said plurality of processed images; and designation display means for displaying said specified image.

2. An image display system according to claim 1, wherein said designation display means displays said specified image at a size larger than said plurality of processed images.

3. An image display system according to claim 1, wherein said means for displaying displays said specified image at a resolution higher than said plurality of processed images.

4. An image display system according to claim 1, wherein said means for displaying displays said plurality of processed images on the same display screen.

5. An image display system according to claim 4, wherein said designation means causes a cursor to be displayed on said display screen and said cursor is moved to specify one of said plurality of processed images.

6. An image display system according to claim 4, wherein said designation means sets arbitrary coordinates on said display screen and specifies one image of said plurality of processed images by specifying coordinates of said one image.

7. An image display system according to claim 1, wherein said designation means directly specifies an arbitrary image of said plurality of processed images on a display screen.

8. An image display system according to claim 1 wherein said designation display means displays said specified image simultaneously with and non-overlapping said plurality of processed images.

9. An image display system according to claim 8, wherein said specified image is displayed on a separate display screen from said plurality of processed images.

10. An image display method for displaying an image, said method comprising the steps of:

converting an original image into a plurality of processed images by using an image processing procedure, the image processing procedure having a parameter which can assume different values;

displaying said plurality of processed images in an array based on an ascending or a descending order of the values of the parameter used for obtaining the plurality of processed images;

selecting an image having an optimum gradation characteristic from among said processed images displayed; and displaying said selected image, wherein the image data has a gradation characteristic whose range is given by window width and whose medium graduation is given by window level and said plurality of images are displayed in a two-dimensional array, one direction of the array corresponding to the window width and a second direction of the array corresponding to the window level, and a display position of each of said various plurality of images being determined by a combination of the window width and the window level.

11. A method according to claim 10, wherein said plurality of processed images are displayed at a reduced size and said selected image is displayed at an enlarged size.

12. A method according to claim 10, wherein said plurality of processed images are displayed at a lower resolution and said selected image is displayed at a higher resolution.

13. A method according to claim 10, wherein said selected image is displayed simultaneously with said plurality of processed images.

14. A method according to claim 13, wherein said plurality of processed images are displayed on a first display device and said selected image is displayed on a second display device.

15. A method according to claim 10, wherein said plurality of processed images and said selected image are displayed on a single display device, and said selected image is displayed entirely over said single display device covering said plurality of processed images.

16. A method according to claim 10, wherein said selected image is selected by means of a pointer displayed on said plurality of processed images.

17. An image display apparatus for displaying image data having image information and at least one gradation characteristic whose range is given by window width and another gradation characteristic whose gradation is given by window level, said image display apparatus comprising:

reduction display means for displaying a plurality of reduced images having said image information and different gradation characteristics arrayed in a two-dimensional array, one direction of the array corresponding to the window width and a second direction of the array corresponding to the window level, and a display position of each of said various plurality of images being determined by a combination of the window width and the window level;

designation means for specifying an image among said reduced images; and designation display means for displaying said specified image independent of said reduced images.

18. An image display apparatus for displaying image having image information and at least two gradation characteristic ranges, one of said ranges being given by window width and another of said ranges being given by window level, said image display apparatus comprising:

reduction display means for displaying a plurality of reduced images having said image information and different gradation characteristics arrayed in a two-dimensional arrangement based on where particular gradation characteristics of each reduced image falls within said two gradation characteristic ranges, one direction of the array corresponding to the window width and a second direction of the array corresponding to the window level, and a display position of each of said various plurality of images being determined by a combination of the window width and the window level;

designation means for specifying an image among said reduced images; and designation display means for displaying said specified image independent of said reduced images.

* * * * *